(12) United States Patent
Vasudevan (10) Patent No.: US 10,951,525 B2
(45) Date of Patent: Mar. 16, 2021

(54) AVAILABILITY OF CONTEXT INFORMATION FOR PACKET PROCESSING

(71) Applicant: Intel Corporation, Santa Clara, CA (US)

(72) Inventor: Anil Vasudevan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 16/383,591

(22) Filed: Apr. 13, 2019

(65) Prior Publication Data

US 2019/0238460 A1  Aug. 1, 2019

Related U.S. Application Data

(60) Provisional application No. 62/788,470, filed on Jan. 4, 2019.

(51) Int. Cl.
*H04L 12/56* (2006.01)
*H04L 12/743* (2013.01)
*H04L 12/725* (2013.01)
*H04L 29/06* (2006.01)
*H04L 12/741* (2013.01)

(52) U.S. Cl.
CPC ........ *H04L 45/7457* (2013.01); *H04L 45/306* (2013.01); *H04L 45/54* (2013.01); *H04L 69/163* (2013.01); *H04L 69/22* (2013.01)

(58) Field of Classification Search
CPC ... H04L 45/7457; H04L 45/306; H04L 69/22; H04L 69/163; H04L 45/54; H04L 69/16; H04L 67/18; H04L 67/1097; H04L 67/2847
See application file for complete search history.

(56) References Cited

U.S. PATENT DOCUMENTS

| 7,720,930 | B2 | 5/2010 | Minturn | |
|---|---|---|---|---|
| 2005/0100042 | A1 | 5/2005 | Illikkal | |
| 2006/0072562 | A1* | 4/2006 | King | G06F 13/385 |
| | | | | 370/389 |
| 2006/0136570 | A1* | 6/2006 | Pandya | H04L 69/16 |
| | | | | 709/217 |
| 2009/0132767 | A1* | 5/2009 | Gao | G06F 12/0888 |
| | | | | 711/138 |
| 2013/0019053 | A1* | 1/2013 | Somanache | G06F 13/1684 |
| | | | | 711/103 |

(Continued)

OTHER PUBLICATIONS

Intel, "Intel Data Direct I/O Technology (Intel DDIO): A Primer", Technical Brief, Feb. 2012, Revision 1.0, 11 pages.

(Continued)

*Primary Examiner* — Lan-Huong Truong
(74) *Attorney, Agent, or Firm* — Compass IP Law PC (57) ABSTRACT

Some examples provide for storage of context information in memory in the process of creating a network connection and subsequent availability of the context information. A context address can refer to context for a packet processing path. A host can provide a context address and associated packet characteristics to a network interface device. If the network interface device receives a packet with the characteristics, the context address can be passed to the host and the host can retrieve the context information using the context address.

19 Claims, 8 Drawing Sheets

(56) References Cited

U.S. PATENT DOCUMENTS

| | | | | |
|---|---|---|---|---|
| 2016/0142308 A1* | 5/2016 | Gage | ................... | H04W 4/70 |
| | | | | 370/392 |
| 2017/0237656 A1* | 8/2017 | Gage | ................... | H04L 61/2521 |
| | | | | 370/392 |
| 2018/0302410 A1* | 10/2018 | Venkataraman | ........ | H04L 69/22 |
| 2018/0314521 A1* | 11/2018 | Chen | ................... | G06N 3/063 |

OTHER PUBLICATIONS

Schuehler, David Vincent, "Techniques for Processing TCP/IP Flow Content in Network Switches at Gigabit Line Rates", Report No. WUCSE-2004-72, Dec. 2004, All Computer Science and Engineering Research, Washington University in St. Louis, Washington University Open Scholarship, USA, 265 pages.

Chen, Tien-Fu, "Data Prefetching for High-Performance Processors", Technical Report Jul. 1, 1993, Department of Computer Science and Engineering University of Washington, Seattle, WA 98195 Jul. 1993, 158 pages.

Parate, Abhinav, et al., "Practical Prediction and Prefetch for Faster Access to Applications on Mobile phones", Sep. 2013 ACM, 10 pages.

Soundararajan, Gokul, et al., "Context-Aware Prefetching at the Storage Server", downloaded from https://www.usenix.org/legacy/event/usenix08/tech/full_papers/soundararajan/soundararajan_html/index.html, (2008).

* cited by examiner

| Entry1 = Match on MAC,IPv4,TCP,Port | Context addresses for MAC, IPV4, TCP, etcetera |
|---|---|
| Entry2 = Match on MAC,VxLAN,IPv4,TCP,Port | Context addresses for MAC, IPV4, TCP, etcetera |
| EntryN = Match on MAC,TCP,Port | Context addresses for MAC, IPV4, TCP, etcetera |

AVAILABILITY OF CONTEXT INFORMATION FOR PACKET PROCESSING

RELATED APPLICATIONS

The present application claims the benefit of priority date of U.S. provisional patent application Ser. No. 62/788,470, filed Jan. 4, 2019, the entire disclosure of which is incorporated herein by reference.

TECHNICAL FIELD

Various examples described herein relate to techniques for context availability during packet processing.

BACKGROUND

Contextual data associated with input/output (I/O) or protocol processing is derived after host software parses the contents of I/O data or a packet. As an example, internet protocol (IP) context for routing is accessed after the IP header is parsed and transmission control protocol (TCP) context for a connection is accessed after the TCP header is parsed. The data movement for associated contexts happens after parsing is completed by the host software. Data movement introduce delays to packet processing arising from copying context from memory into cache.

DETAILED DESCRIPTION

Context lookups are used throughout the networking stack. Context lookups are performed during network and application processing to retrieve the associated contextual data and optionally update the context. Also, the context is used to evaluate next steps in the packet processing pipeline. For example, after receipt of a packet, a TCP context is looked up, and based on the current context, a decision is made on whether to acknowledge a packet or not.

In an existing approach to processing of received packets, contextual data is determined and accessed as part of packet and application processing, and contextual data is not known prior to packet or application processing. Contextual data is available or accessed in software after a packet is parsed and a lookup performed on the appropriate header (e.g., media access control (MAC), internet protocol (IP), transmission control protocol (TCP), or higher layer). The lookup operation locates the associated contextual data in memory and the associated context is loaded into a processor cache.

For packet processing, each vetting operation involving lookup involves matching a packet context with a table entry, finding a match, and retrieving associated context. As the number of packets increases, the total time for lookups can increase. Lookups can consume central processing unit (CPU) cycles, and there are a few through the entire packet processing stack, executed per packet.

Intel® direct data I/O (DDIO) copies received packet data into a last level cache. Contextual data is local, e.g., context associated with various elements of the network and application stack that is accessed as packet and application processing executes on a core, e.g. socket context, TCP context, IP context, app context, and so forth.

Processor optimizations such as out of order execution and speculative data movement, e.g., the use of spatial locality predictors to prefetch data can help improve performance and work well in scenarios where the access patterns lend themselves for prediction (e.g., a spatial locality predictor encounters a cache miss on a line, fetches that line and the next one because the access pattern appears to be linear, and/or has hit a certain threshold for cache misses). However, if the time between when data is needed and a time a prefetch was issued is not sufficiently large, pipeline stall can occur. Furthermore, prefetchers tend to copy more data than is actually needed or accessed, which, can waste useful cache space.

Efficient data movement and associated processing are critical system architecture requirements for any system design. In particular, efficient data movement related to processing for systems designed with high speed I/O devices (e.g., network interface controllers, storage controllers or accelerators) is critical to improving system performance. Data movement and associated processing for I/O falls into two broad categories: (i) moving and processing data that the I/O device generates or consumes and (ii) moving and processing contextual data associated with the data that the I/O device generates and consumes.

Various embodiments provide a context assisted data movement and processing for I/O in a deterministic and efficient data movement algorithm that addresses category (ii) of data movement and associated processing referenced above. A CPU can store data movement hints on an I/O device that is returned to the CPU upon matching I/O events. These hints can be used to trigger data movement operations from the CPU, to keep the highest level caches primed with contextual data that the CPU needs for processing the data produced or consumed by an I/O device (category (i) referenced above). Context assisted data movement can be used for functions other than data movement as well.

Various embodiments provide for deterministic contextual prefetching and accelerated I/O processing from unifying the hardware and software I/O processing pipeline through a shared context. For example, in the case of a network interface controller (NIC), the shared context is a pointer that contains flow specific contextual (e.g., TCP flow) addresses configured on the NIC per flow entry. This pointer is returned for ingress and egress related descriptor completions that match a specific flow entry, enabling prefetching to be done early in the pipeline with sufficient prefetch distance. Also, the shared context can eliminate the need for context lookups during software packet processing because the NIC has performed the lookup by matching the flow entry and returning the shared context pointer, potentially significantly speeding up packet processing.

For example, a TCP/IP connection can be opened with 5 tuple attribute (e.g., source IP address/port number, destination IP address/port number, and the protocol in use). Context information created when a TCP/IP connection is created can be stored in memory and a pointer to the start of the context information also stored. A context address can refer to all relevant context for a packet processing path. A host can provide a context address and associated packet characteristics to a network interface device. If the network interface device receives a packet with the characteristics, the context address can be passed to the host (e.g. using a descriptor).

A context address refers to a beginning of context information address area. A context address can refer to a start of a first context information address. At an offset from the first context address, a second context address can be stored, and so forth. An operating system or driver can use an offset from beginning of context address to retrieve a next relevant context information address. A first context information address can be an address in memory or storage that stores context information. The first context information address can be used to access context information starting at the context address. For example, the first context information address can be a TCP context for an established connection.

Associated contextual data movement can be demand fetched or out-of-order fetched, depending on the prefetch distance of an out of order capable CPU. Demand fetched data introduces cache miss latency and access times from level-2 (L2) cache can be 2× worse than from the level-1 (L1) data cache, and the access times from the last level cache (LLC) can be approximately 10× worse than that of L1. In some cases, the payload and the context should be at the highest level in the caching hierarchy (e.g. L1 cache) at the time of execution. In many cases, the payload and context data has to be brought from the last level cache (LLC) to L1, causing stalls in the pipeline. In existing solutions, the payload is copied to the LLC via DDIO and the context data could be anywhere in the caching hierarchy (e.g., in the LLC or mid-level cache (MLC)). However, both need to be copied to the L1 during processing. In order to do so efficiently, a minimum prefetch distance is needed to overlap compute and data movement. In previous solutions, this distance is too short, causing misses in L1 and stalls in the pipeline, especially for contextual data. In some examples, a device (e.g., NIC) or software can issue prefetch to copy a context information to an L1 cache before an associated core executes protocol or higher layer (e.g., application layer) processing.

The partitioning described herein can improve I/O processing performance which is becoming increasingly important as systems become disaggregated and distributed. Additionally, various embodiments can optimize data movement that could reduce power use.

A network interface controller performs packet parsing on incoming packets for classification (e.g. extract the network layer, transport layer and in some cases application layer attributes). The operating system's stack can perform many of the same functions, once its packet processing pipeline starts, such as parsing the network header, transport header and any other upper layer headers before passing the payload to the application. Each of these layers has an associated context. The parsing gets the 5 tuple that points to the context. Once the context is identified, it is updated or looked at for additional information, e.g., in the case of TCP, sequence numbers are updated in the TCP context or, in the case of sockets, the socket queuing structures are updated to indicate the presence of a payload for the application. These data structures tend to be fairly large to always remain in the highest layers of the cache. So, when a packet traverses through the stack, at each layer, the appropriate context is accessed, and additional processing performed. These contexts are typically stored as lists by an operating system (e.g. file descriptor, connection/socket list).

Host software provides a signature to look for and its associated context to the NIC through the NIC's control or data plane interface. This signature uniquely identifies a context (e.g. by programming a Flow Director entry in a NIC and the supplied context points to an array of addresses to prefetch). Thus, when a packet arrives and hits a matching entry in the Flow Director table of a NIC, the NIC retrieves the associated programmed context and returns the associated programmed context to the host along with the packet and other completion information. The host checks for a valid context and issues prefetches for the addresses contained in the context, if it determines that one exists. For example, the context could contain addresses to network layer contexts, transport layer contexts and socket layer contexts, which could all be prefetched, well ahead of the processing. These prefetches could prevent protocol processing pipeline from stalling, because prior to executing, associated data is prefetched and made available at the highest levels of the caching hierarchy. This can improve performance significantly, because the access times from L2 cache is 2× worse than from the L1 data cache, and the access times from the LLC (last level cache) is approximately 10× worse than L1. Also, since the data is already present, the prefetchers are not activated, keeping out unused speculative data from unnecessarily occupying cache space. In addition, the protocol processing does not have to do packet lookups and can leverage that information from the NIC that has already performed the operation in its data path for each flow before the protocol processing code starts executing.

Figure 1:
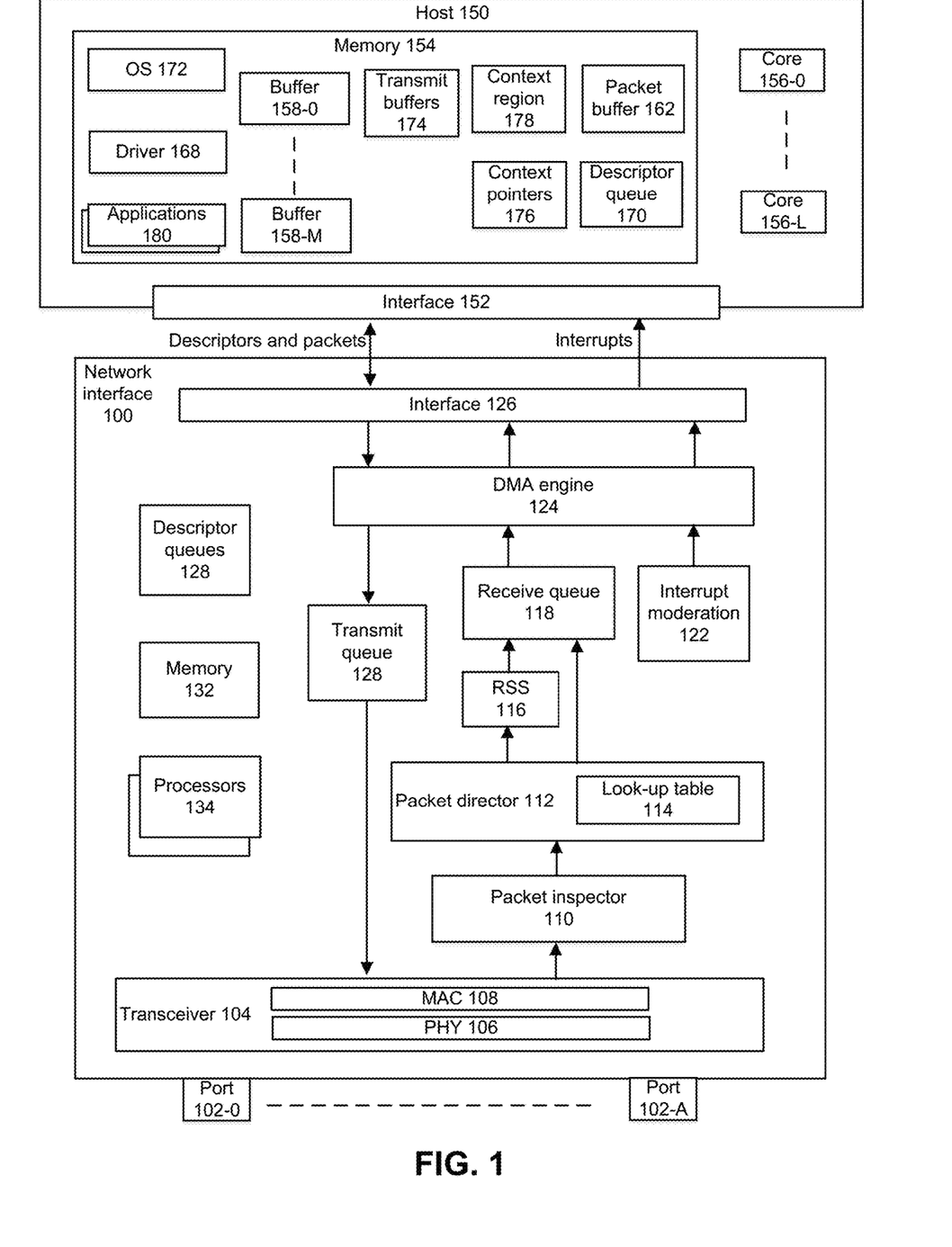
FIG. 1 depicts an example system including a network interface and a host system.

FIG. 1 depicts an example system including a network interface and a host system. Network interface 100 provides for identifying packets (transmit or receive) that have associated context information stored in memory of network interface 100 or host 150. The context information can be retrieved for one or more packets for packet or application processing of a received packet by network interface 100 or a packet to be transmitted by network interface 100. For example, a "smart network interface" can provide packet processing capabilities in the network interface using processors 134.

Network interface 100 includes one or more ports 102-0 to 102-A. A port can represent a physical port or virtual port. A packet received at a port 102-0 to 102-A is provided to transceiver 104. Transceiver 104 provides for physical layer processing 106 and MAC layer processing 108 of received packets. Packet inspector 110 can inspect a received packet and determine characteristics of the received packet. For example, packet inspector 110 can determine a TCP flow or characteristics of the received packet or packet to transmit. The TCP flow or characteristics of the received packet or packet to transmit can be one or more of: destination MAC address, IPv4 source address, IPv4 destination address, portion of a TCP header, Virtual Extensible LAN protocol (VXLAN) tag, receive port, or transmit port.

Packet director 112 can determine whether look-up table 114 includes an entry that corresponds to one or more characteristics of the received packet or a packet to be transmitted (or re-transmitted). For example, look-up table 114 can include a context address associated with one or more characteristics of a received or transmit packet. If a match is found, a context pointer is provided to host 150 in a descriptor. If no match is found, a null context pointer is provided to host 150 in a descriptor. The context address can refer to a region in memory of network interface 100 or host 150 and that is a start of one or more context information pointers. The context information pointers can refer to a region in memory of network interface 100 or host 150 that stores context information. Context information can be pre-fetched into a cache (e.g., L1) for availability to process by a core that is to process the context information. In some examples, look-up table 114 can be an associative data structure that associates packet characteristics with a context address.

RSS 116 can calculate a hash value on a portion of a received packet and use an indirection table to determine a receive queue (among buffers 158-0 to 158-M) and associated core in host 150 to process a received packet. RSS 116 stores the received packets into receive queue 118 for transfer to host 150. Packets with the same calculated hash value are provided to the same buffer, for example buffer 158-0.

Direct memory access (DMA) engine 124 can transfer contents of a packet and a corresponding descriptor from descriptor queues 128 to one or more of packet buffer 162, a selected queue (e.g., buffer 158-0 to 158-M), and descriptor queue 170 in host 150 or one descriptor queue for each of buffers 158-0 to 158-M. For example, a portion of the packet can be copied via DMA to packet buffer 162 with a reference to a location in packet buffer 162 of the packet stored in a selected queue. Direct memory access (DMA) is a technique that allows an input/output (I/O) device to bypass a central processing unit (CPU) or core, and to send or receive data directly to or from a system memory. Because DMA allows the CPU or core to not manage a copy operation when sending or receiving data to or from the system memory, the CPU or core can be available to perform other operations. Without DMA, when the CPU or core is using programmed input/output, the CPU or core is typically occupied for the entire duration of a read or write operation and is unavailable to perform other work. With DMA, the CPU or core can, for example, initiate a data transfer, and then perform other operations while the data transfer is in progress. The CPU or core can receive an interrupt from a DMA controller when the data transfer is finished. DMA engine 124 can perform DMA coalescing whereby the DMA engine 124 collects packets before it initiates a DMA operation to a queue in host 150.

Receive Segment Coalescing (RSC) can also be utilized whereby content from received packets is combined into a packet or content combination. DMA engine 124 can copy this combination to a queue (e.g., any of buffer 150-0 to 158-M).

Interrupt moderation 122 can determine when to perform an interrupt to inform host system 150 that a packet or packets or references to any portion of a packet or packets is available for processing from a queue. An expiration of a timer or reaching or exceeding a size threshold of packets can cause an interrupt to be generated. An interrupt can be directed to a particular core among cores 156-0 to 156-L that is intended to process a packet.

Referring to host system 150, device driver 168 can be a processor executed driver that serves as a device driver for network interface 100. Device driver 168 can create descriptors and manage the use and allocation of descriptors for a receive queue. Device driver 168 can process interrupts from network interface 100 that inform the host system 102 of a copy of a received packet into packet buffer 162 or memory 154 on host 102. Device driver 168 can determine the location of the receive packet in packet buffer 162 based on a return descriptor that describes such received packet and device driver 168 can inform operating system 172 of the availability and location of the received packet.

Applications 180 can be any processor-executed applications that provide data for transmission or process data from received packets. Applications 180 can be any kind of application such as a database, image processor, photo album, artificial intelligence interference engine, and so forth.

Context pointers 176 can refer to pointers to addressable locations in memory 154. The locations can refer to locations in context region 178. A context pointer provided by DMA engine 124 in a descriptor can refer to a beginning of a group of context information pointers in context pointer 176. A group of context information pointers can refer to one or more context information in context region 178. For example, a context information pointer in context pointers 176 can refer to a starting memory location of a MAC context information, a next context information pointer can refer to a starting memory location of an IPv4 context information, and so forth. Context region 178 can include the context information pointed to by context information pointers in context pointers 176.

In some embodiments, driver 168, OS 172, or network interface 100 can issue speculative fetches for context information ahead of processing. Driver 168 can inspect a receive or transmit completion descriptor to retrieve a context address. The context address can refer to one or more context information pointers in context pointers 176. Context pointers 176 can refer to context information in context region 178 and are copied and stored into a cache associated with a core that is to process the context information. For example, context information can include one or more of: MAC context information, IP context information, TCP context information, application context information, and so forth. Network interface 100 can cause prefetch (without driver 168) of context information using a system agent or core into a cache accessible by a core or shared by one or more cores.

A system agent can include or more of: a memory controller, a shared cache, a cache coherency manager, arithmetic logic units, floating point units, core or processor interconnects, or bus or link controllers. The system agent can provide one or more of: direct memory access (DMA) engine connection, non-cached coherent master connection, data cache coherency between cores and arbitrates cache requests, or Advanced Microcontroller Bus Architecture (AMBA) capabilities. The system agent can manage priorities and clock speeds for receive and transmit fabrics and memory controllers.

A received packet in packet buffer 162 can be retrieved and processed. Driver 168 can inform OS 172 of availability of a received packet. OS 172 can apply MAC layer processing on the packet using MAC context information including using driver data structures, driver statistic structures, and so forth. The MAC context information can be prefetched into cache of a core that performs MAC layer processing.

OS 172 can apply IP layer processing of an IP header and decide whether packet needs to be pushed to TCP layer processing or forwarded out of system. To decide, IP layer extracts information from a packet to inspect IPv4 context (e.g., action, forward, up host). IP context information prefetched into a cache can be used to decide on the next stage for the received packet. TCP layer processing includes inspecting a TCP header, determining TCP compliance to check if sequence number is expected. TCP context information loaded into a cache of a core that performs TCP layer processing to process the packet. TCP context information can include one or more of: sequence number, congestion window, outstanding packets, out of order queue information, and so forth. For example, TCP context information can be loaded into a cache of a core that performs TCP layer processing.

In some embodiments, one or more processor cores 156-0 to 156-L can process instructions which, when executed, perform operations for system and/or user software. In some embodiments, each at least one of the one or more processor cores 156-0 to 156-L is configured to process a specific instruction set. In some embodiments, an instruction set may facilitate Complex Instruction Set Computing (CISC), Reduced Instruction Set Computing (RISC), or computing via a Very Long Instruction Word (VLIW). Multiple one or more processor cores 107 may each process a different instruction set, which may include instructions to facilitate the emulation of other instruction sets. Cores can be homogeneous or heterogeneous devices.

In some embodiments, one or more processor cores 156-0 to 156-L includes cache memory. Depending on the architecture, one or more processor cores 156-0 to 156-L can have a single internal cache or multiple levels of internal cache. In some embodiments, the cache memory is shared among various components of one or more processor cores 156-0 to 156-L. In some embodiments, one or more processor cores 156-0 to 156-L also uses an external cache (e.g., a Level-3 (L3) cache or Last Level Cache (LLC)) (not shown), which may be shared among one or more processor cores 156-0 to 156-L using cache coherency techniques.

Transmit buffers 174 can be used to store content to be transmitted using network interface 100 via DMA engine 124, transmit queue 128, and transceiver 104 to a network medium.

Figure 2:
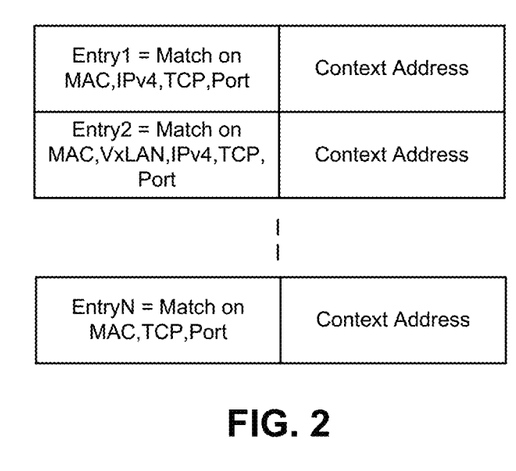
FIG. 2 depicts an example table.

FIG. 2 depicts an example table. The table can be stored in memory and used to find a match between characteristics of a packet (or other data structure) and a context address. The characteristics can include one or more of: MAC source address, MAC destination address, IPv4 source address, IPv4 destination address, TCP header information, or network interface receive port identifier. A context address can be an address in memory of a start of a group of one or more pointers to context information. The address in memory can be in a network interface or a different device. The context information can include a media access control (MAC) context, IPv4 context, TCP context, socket context, or an application context.

Figure 3:
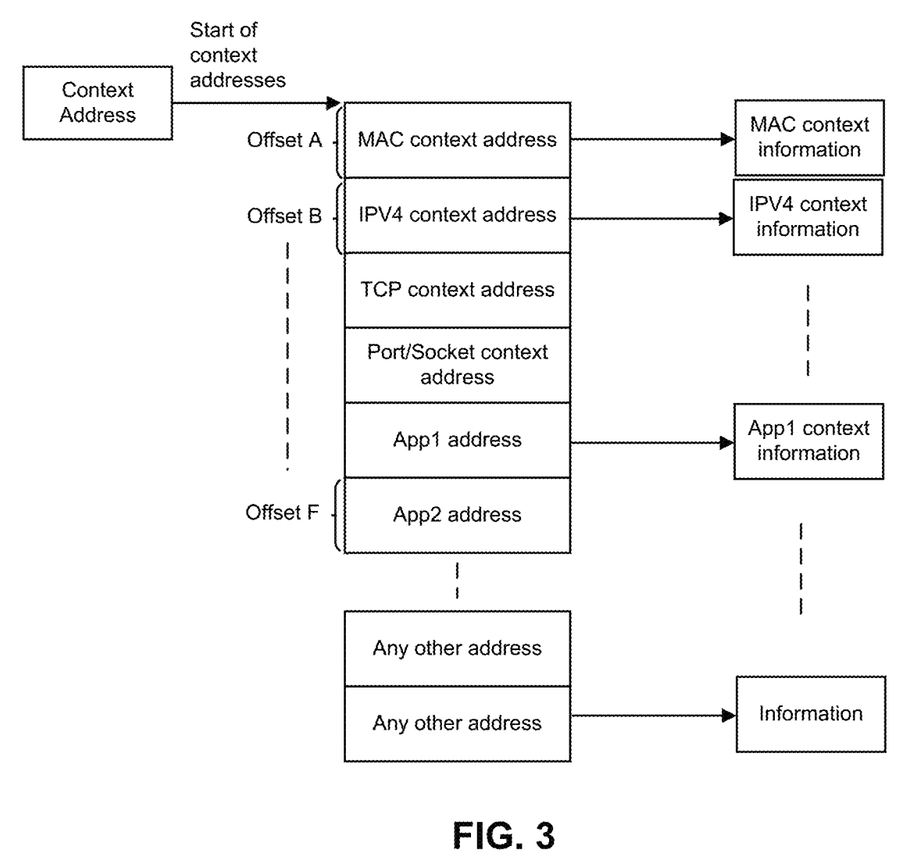
FIG. 3 depicts an association between a context address and context.

FIG. 3 depicts an association between a context address and context. In this example, the context address refers to an address in memory (e.g., logical or physical address) for a start of a group of one or more context information addresses. The context information address can be a first in a group of multiple context information addresses and each context information address can be a size of 64 bits or other size (offset A). The first context information address can refer to a MAC context address and the first context information address can refer to a MAC context information. After the first context information address in memory, a second context information address is stored. A second context information address can refer to an IPv4 context information. The context information address can be a size shown as offset B. Other context information addresses can refer to other context information.

For example, MAC context information can include information related to a MAC context and can include driver data structures, driver statistic structures, and so forth. For example, IPv4 context information can refer to IPv4 packet processing information such as routing tables, decision to forward, transfer to host, and so forth. For example, TCP context information can refer to information related to a TCP connection and can include one or more of: sequence number, congestion window, outstanding packets, out of order queue information, and so forth. For example, port/socket context information can refer to socket level context information such as but not limited to socket settings, socket flags, address family of socket, queue in network interface device associated with the socket, state of connection (e.g., wait, sleep, activity), threads that are waiting for action, and so forth. For example, app address information can refer to data related to application processing context information. For example, multi-thread operation involving execution of the application can be tracked in a context. For example, for memcache applications, context information can include one or more of: a control socket (e.g., control information, clients, connections, identification of other memcache servers, status of servers (alive or down), notable event on server), and data socket (hash table entries).

Figure 4:
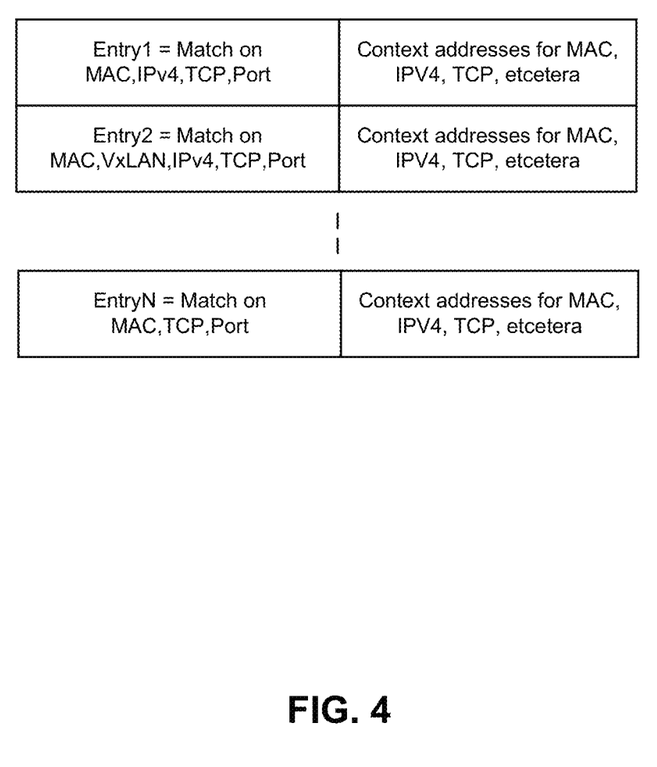
FIG. 4 depicts an example table.

FIG. 4 depicts an example table. The table can be stored in memory and used to find a match between characteristics of a packet (or other data structure) and one or more context information. The table can be stored in memory of a network interface or a different device (e.g., host computing platform). The characteristics can include one or more of: MAC source address, MAC destination address, IPv4 source address, IPv4 destination address, TCP header information, or network interface receive port identifier. The context information can include one or more of: media access control (MAC) context, IPv4 context, TCP context, socket context, or an application context.

Figure 5:
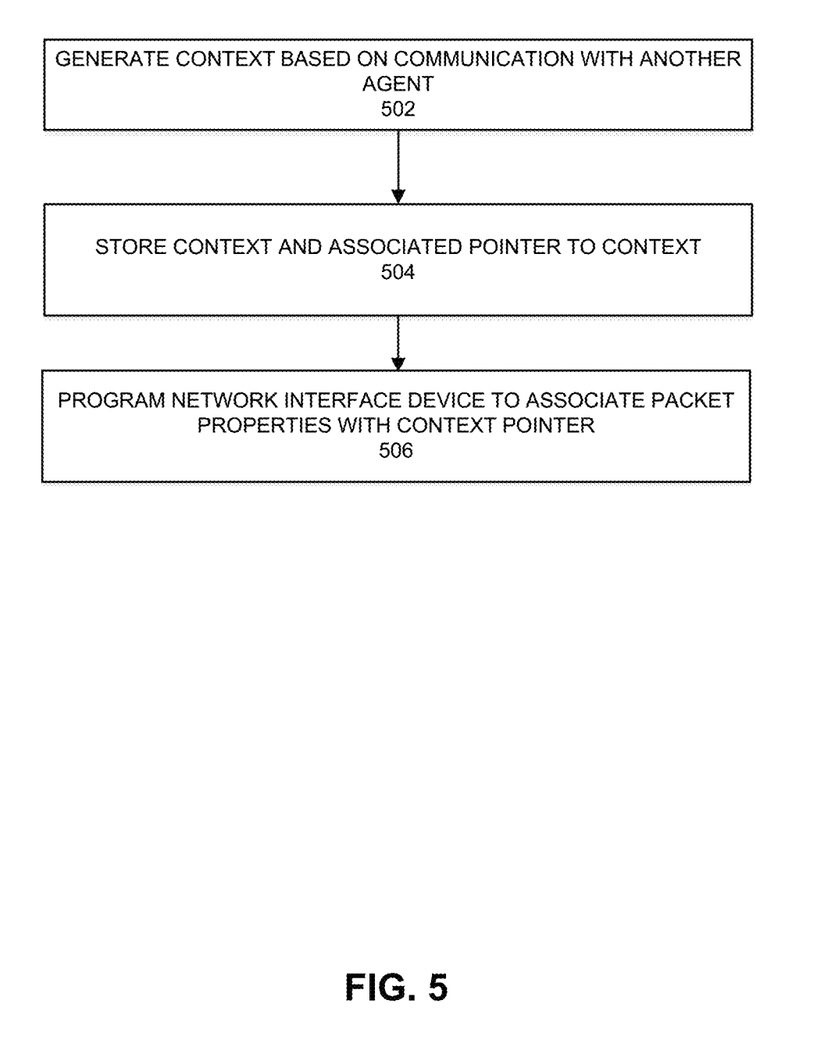
FIG. 5 depicts a flow diagram.

FIG. 5 depicts a flow diagram. The process of FIG. 5 can be used to setup a connection or communication channel between an application and a destination device or software program for communication. At 502, an operating system can setup a communication for an application with another agent (e.g., software, device) for communication over a network and save a context associated with the channel. For example, for a TCP/IP-based communication channel, the context can include one or more of: MAC context information, IPv4 context information, TCP context information, port/socket context information, and application context information.

At 504, the context information can be stored in memory and a pointer to the beginning of the memory location of the context can be tracked. The memory can be in a host computing platform or a network interface. For example, the operating system, driver, or other software that created the communication channel can store the context information into memory and track a pointer to the beginning of the context information.

At 506, a look-up-table can be updated to include an association between packet characteristics and a pointer to context information associated with the packet characteristics. For example, packet characteristics can be characteristics of the communication channel such as one or more of: source MAC address, destination MAC address, IPv4 source address, IPv4 destination address, portion of a TCP header, Virtual Extensible LAN protocol (VXLAN) tag, receive port, or transmit port. For example, a host operating system or network interface driver can identify the context information to be prefetched and store the information into an array on the network interface device. The host operating system or network interface driver programs a packet director of a network interface device and its associated look-up-table.

Figure 6:
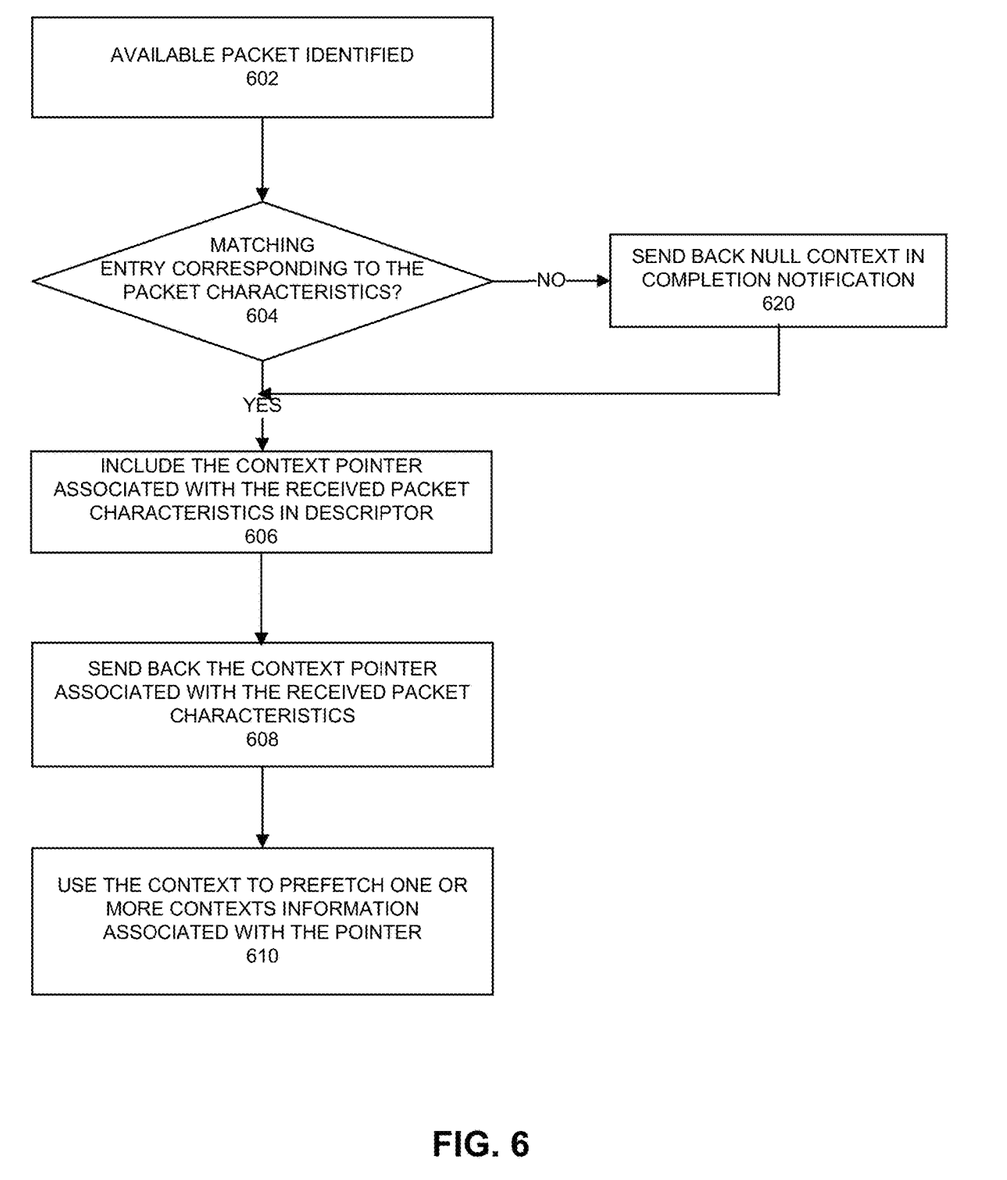
FIG. 6 depicts a flow diagram.

FIG. 6 depicts a flow diagram. The process of FIG. 6 can be used by a network interface controller (NIC) in connection with receipt of a packet. At 602, a packet is identified at a NIC. The packet can be received by the NIC from a network medium. In some cases, the packet can be provided for transmission to a network medium. At 604, the NIC parses the packet and checks if there is a matching packet director entry for packet characteristic(s) and context pointer. The NIC can store a look-up-table associating packet characteristics with a context pointer. For example, packet characteristics can be one or more of: source MAC address, destination MAC address, IPv4 source address, IPv4 destination address, portion of a TCP header, Virtual Extensible LAN protocol (VXLAN) tag, receive port, or transmit port. The context pointer can point to a first context information pointer in a group of one or more context information pointers. If there is a matching entry, then at 606, a descriptor is modified to include the context pointer. If there is not a matching entry, then 620 follows and a null context is provided as a context pointer in the descriptor to the host system.

At 608, the network interface copies the payload and a corresponding descriptor which contains additional information about the received packet (e.g., using DMA to memory). The descriptor includes the context pointer or a null context pointer.

At 610, the host software processes the descriptor and checks to see if there is an associated context information entry. If context information entry exists, the host software issues prefetches for all the elements in the array of addresses into one or more cache (e.g., L1) associated with the cores that are to process the packet content at each layer. Prefetching can occur at the device driver so that by the time upper layer protocol processing starts, the associated data is ready at the cache.

As the protocol processing pipeline executes, it is primed with the associated data and does not see stalls from needing to demand load data from lower levels of the caching hierarchy. Additionally, protocol processing is sped up because it does not perform any lookups to determine contexts at each layer of the stack. The associated context data structure contains that information and is passed up. Since the matched signature is unique the data plane processing can proceed by accessing these pointers directly from the supplied context without needing to perform lookups to retrieve these pointers.

The process of FIG. 6 can be used for a packet to be transmitted from a network interface using a network medium to another device. For example, if an identified packet is a transmit packet, upon completion of a user datagram protocol (UDP) egress packet for transmission, the transmit completion could carry contextual information that prepares the processor caches for additional transmission(s) or UDP message completion processing. For example, a host informs a network interface device to transmit a packet. The network interface device transmits the packet and informs a host device that a transmit is complete (e.g., using a descriptor). The descriptor can include context address for the transmitted packet. The context address can be used to load one or more context information into a cache (e.g., L1) to use to transmit additional packets with the same context.

While the above description provides a network I/O example, this usage is not limited to network I/O alone. Any I/O interaction could utilize this technique to speed up completion processing. The contextual handoff from one device to another (e.g. NIC to CPU) can be generalized beyond data movement to further enhance performance.

Figure 7:
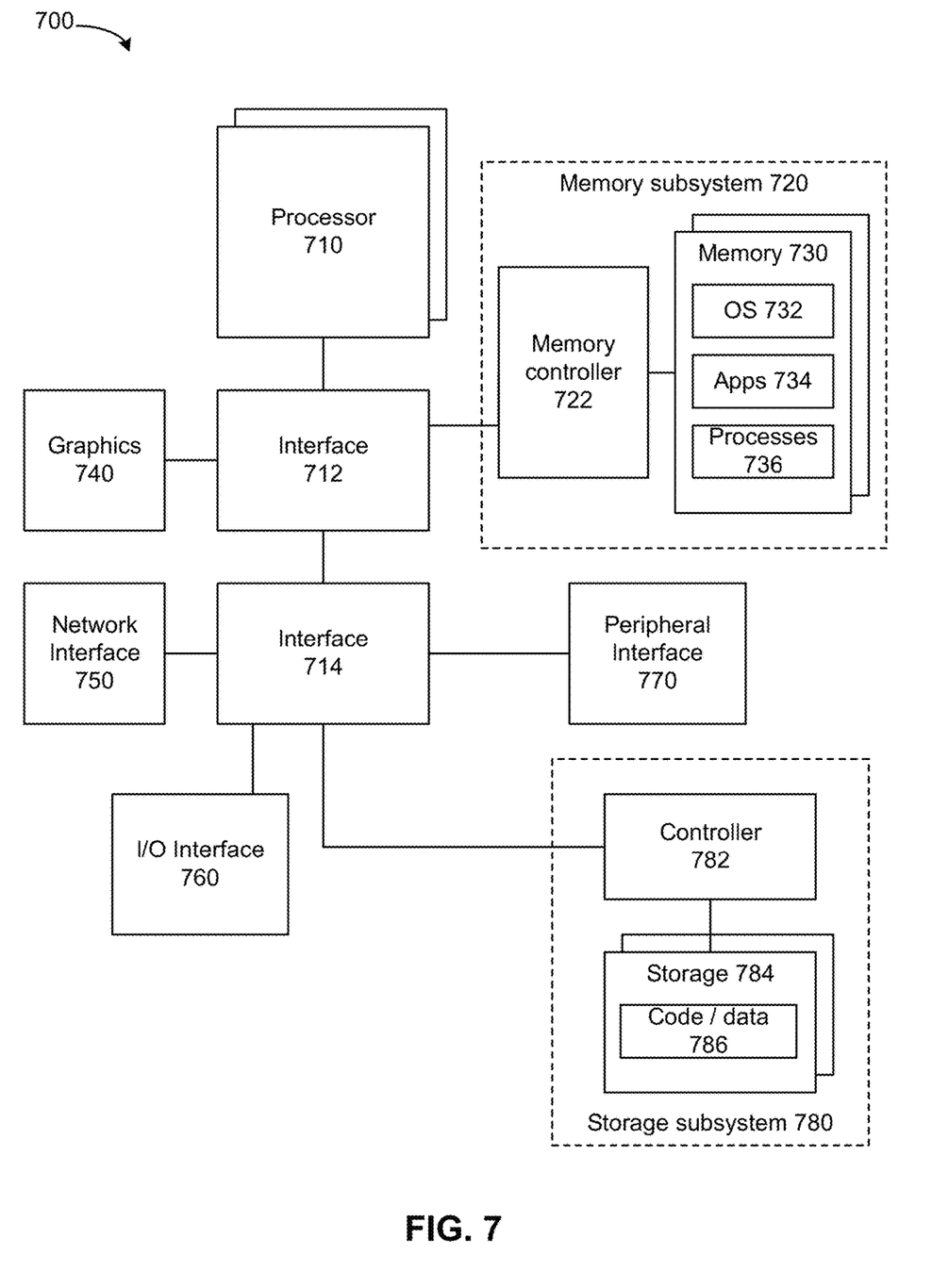
FIG. 7 depicts a system.

FIG. 7 depicts a system. The system can use embodiments described herein. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 700 includes interface 714, which can be coupled to interface 712. In one example, interface 714 represents an interface circuit, which can include stand-alone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a remote device, which can include sending data stored in memory. Network interface 750 can receive data from a remote device, which can include storing received data into memory. Various embodiments can be used in connection with network interface 750, processor 710, and memory subsystem 720.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as PCIe, Ethernet, or optical interconnects (or a combination thereof).

Figure 8:
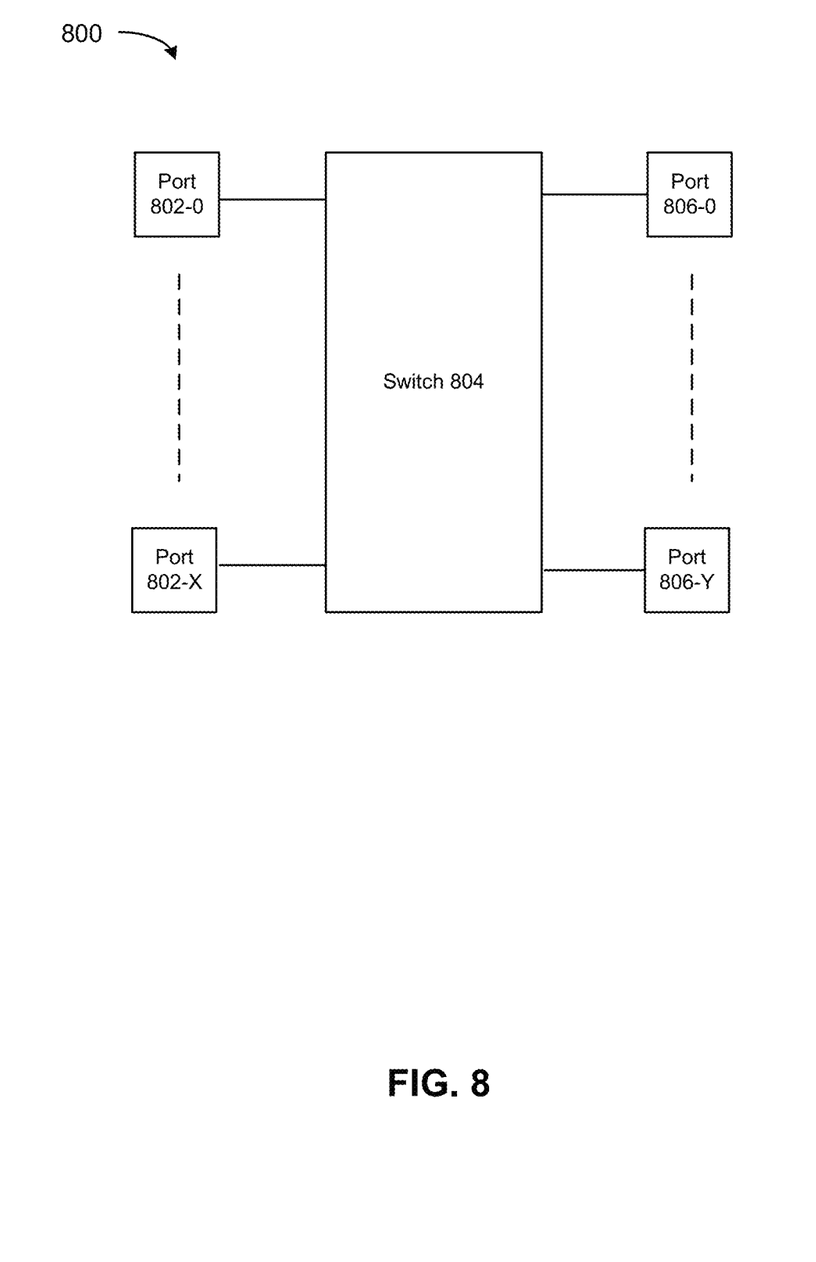
FIG. 8 depicts a switch.

FIG. 8 depicts a switch. Various embodiments can be used in or with the switch of FIG. 8. Switch 804 can route packets or frames of any format or in accordance with any specification from any port 802-0 to 802-X to any of ports 806-0 to 806-Y (or vice versa). Any of ports 802-0 to 802-X can be connected to a network of one or more interconnected devices. Similarly, any of ports 806-0 to 806-X can be connected to a network of one or more interconnected devices. Switch 804 can decide which port to transfer packets or frames to using a table that maps packet characteristics with an associated output port. In addition, switch 804 can perform packet replication for forwarding of a packet or frame to multiple ports and queuing of packets or frames prior to transfer to an output port.

Figure 9:
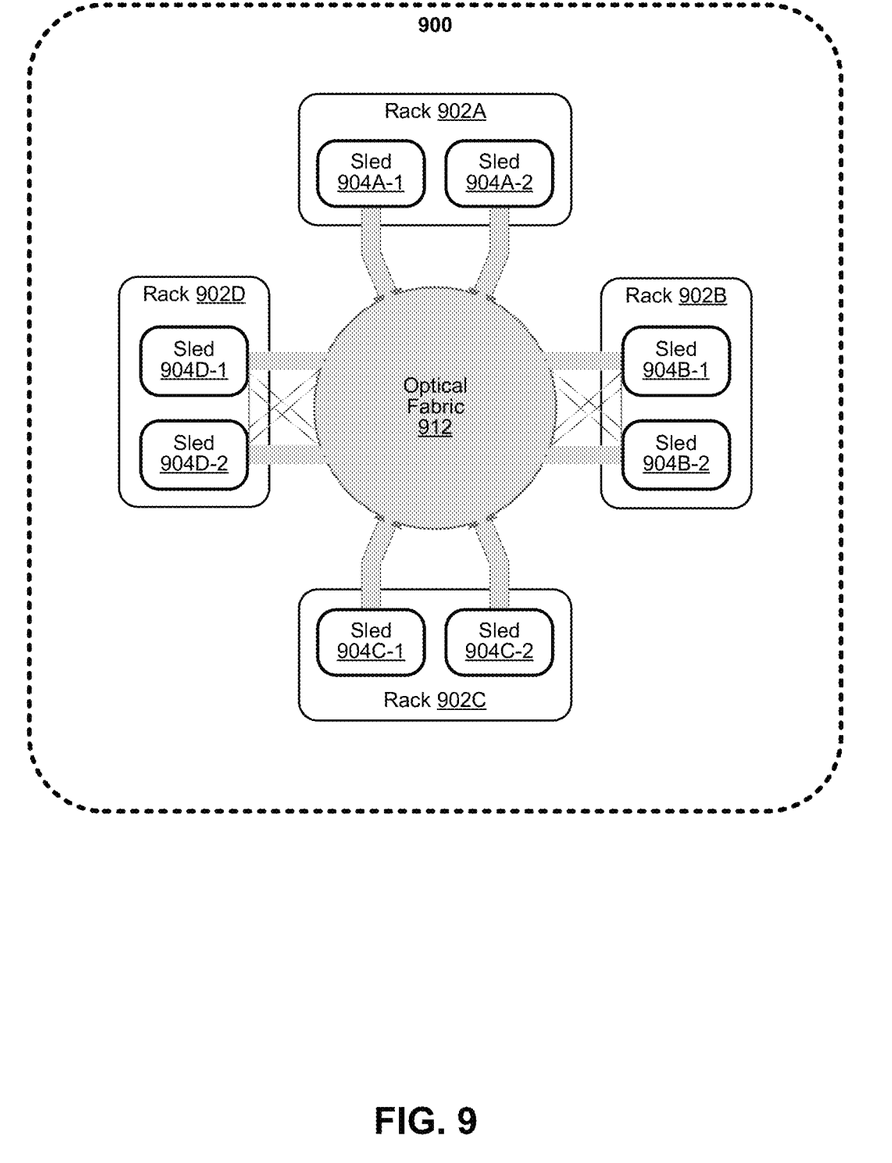
FIG. 9 depicts an example of a data center.

FIG. 9 depicts an example of a data center. Various embodiments can be used in or with the data center of FIG. 9. As shown in FIG. 9, data center 900 may include an optical fabric 912. Optical fabric 912 may generally include a combination of optical signaling media (such as optical cabling) and optical switching infrastructure via which any particular sled in data center 900 can send signals to (and receive signals from) the other sleds in data center 900. The signaling connectivity that optical fabric 1012 provides to any given sled may include connectivity both to other sleds in a same rack and sleds in other racks. Data center 900 includes four racks 902A to 902D and racks 902A to 902D house respective pairs of sleds 904A-1 and 904A-2, 904B-1 and 904B-2, 904C-1 and 904C-2, and 904D-1 and 904D-2. Thus, in this example, data center 900 includes a total of eight sleds. Optical fabric 9012 can provide sled signaling connectivity with one or more of the seven other sleds. For example, via optical fabric 9012, sled 904A-1 in rack 902A may possess signaling connectivity with sled 904A-2 in rack 902A, as well as the six other sleds 904B-1, 904B-2, 904C-1, 904C-2, 904D-1, and 904D-2 that are distributed among the other racks 902B, 902C, and 902D of data center 900. The embodiments are not limited to this example. For example, fabric 912 can provide optical and/or electrical signaling.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof.

Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes an apparatus comprising a network interface, the network interface comprising: a memory and at least one processor, the at least one processor to: store a look-up table, the look-up table comprising packet characteristics and associated context pointer; determine if a packet has characteristics matching an entry stored in the look-up table; and in response to the packet having characteristics matching an entry stored in the look-up table, provide the associated context pointer for the matched entry for prefetch of context information related to the packet.

Example 2 includes the subject matter of any Example, wherein the at least one processor is to cause a prefetch of one or more context information associated with the packet into a processor cache.

Example 3 includes the subject matter of any Example, wherein to cause a prefetch of one or more context information associated with the packet into a processor cache comprises cause copying of context information prior to processing of the context information.

Example 4 includes the subject matter of any Example, wherein the processor cache comprises a level 1 cache.

Example 5 includes the subject matter of any Example, wherein the characteristics comprise one or more of: destination media access control (MAC) address, IPv4 source address, IPv4 destination address, portion of a transmission control protocol (TCP) header, Virtual Extensible LAN protocol (VXLAN) tag, receive port, or transmit port.

Example 6 includes the subject matter of any Example, wherein the context pointer comprises a memory address pointer to a start of a group of one of more context pointers to one or more context information, wherein the one or more context information comprise one or more of: a media access control (MAC) context, IPv4 context, transmission control protocol (TCP) context, socket context, or an application context.

Example 7 includes the subject matter of any Example, wherein the packet comprises a received packet or a transmit packet.

Example 8 includes the subject matter of any Example, wherein the look-up table is stored in the network interface memory.

Example 9 includes the subject matter of any Example, wherein the look-up table is stored in a host system memory.

Example 10 includes the subject matter of any Example, wherein the context information is stored in the network interface memory.

Example 11 includes the subject matter of any Example, wherein the context information is stored in a host system memory.

Example 12 includes the subject matter of any Example, wherein the network interface is coupled to a server computing platform, a host computer, a rack, or a data center.

Example 13 includes a method comprising at a network interface, providing to a host system a context address related to context information associated with a packet, the context information associated at least with network protocol processing.

Example 14 includes the subject matter of any Example, comprising causing a prefetch of context information associated with the packet into a processor cache, wherein the processor cache comprises a level 1 cache.

Example 15 includes the subject matter of any Example, wherein the context information comprises one or more of: a media access control (MAC) context, IPv4 context, transmission control protocol (TCP) context, socket context, or an application context.

Example 16 includes the subject matter of any Example, wherein the context address comprises a memory address pointer to a start of a group of one of more context pointers to one or more context information, wherein the one or more context information comprise one or more of: a media access control (MAC) context, IPv4 context, transmission control protocol (TCP) context, socket context, or an application context.

Example 17 includes the subject matter of any Example, wherein the packet comprises a packet received at the network interface or a packet provided for transmission from the network interface.

Example 18 includes a system comprising: a network interface comprising at least one processor and at least one memory; a computing platform communicatively coupled to the network interface and comprising at least one processor and at least one memory, wherein the at least one processor of the network interface to: process a packet to determine a context address associated with the packet and provide a portion of the packet and the context address to the computing platform; the at least one processor of the computing platform to: retrieve context information associated with the context address and use a portion of the context information to process the packet.

Example 19 includes the subject matter of any Example, wherein to retrieve a context associated with the context address, the at least one processor of the computing platform is to cause a prefetch of context information associated with the packet into a processor cache.

Example 20 includes the subject matter of any Example, wherein the context information comprises one or more of: a media access control (MAC) context, IPv4 context, transmission control protocol (TCP) context, socket context, or an application context.

What is claimed is:

1. An apparatus comprising a network interface, the network interface comprising:
    a memory and
    at least one processor, the at least one processor to:
        store a look-up table, the look-up table comprising at least one entry, wherein the at least one entry comprises packet characteristics and an associated context pointer and wherein the packet characteristics and the associated context pointer are to program the network interface to monitor for one or more flows corresponding to the packet characteristics;
        determine if a packet has characteristics matching content of an entry stored in the look-up table; and
        in response to the packet having characteristics matching content of an entry stored in the look-up table, provide an associated context pointer for the matched entry for prefetch of context information related to the packet, wherein:
    the at least one processor is to cause a prefetch of one or more context information associated with the packet into a processor cache,
    to cause a prefetch of one or more context information associated with the packet into the processor cache comprises cause copying of context information prior to processing of the context information.

2. The apparatus of claim 1, wherein the processor cache comprises a level 1 cache.

3. The apparatus of claim 1, wherein the characteristics comprise one or more of: destination media access control (MAC) address, IPv4 source address, IPv4 destination address, portion of a transmission control protocol (TCP) header, Virtual Extensible LAN protocol (VXLAN) tag, receive port, or transmit port.

4. The apparatus of claim 1, wherein the context pointer comprises a memory address pointer to a start of a group of one of more context pointers to one or more context information, wherein the one or more context information comprise one or more of: a media access control (MAC) context, IPv4 context, transmission control protocol (TCP) context, socket context, or an application context.

5. The apparatus of claim 1, wherein the packet comprises a received packet or a transmit packet.

6. The apparatus of claim 1, wherein the look-up table is stored in the memory.

7. The apparatus of claim 1, wherein the look-up table is stored in a host system memory.

8. The apparatus of claim 1, wherein the context information is stored in the memory.

9. The apparatus of claim 1, wherein the context information is stored in a host system memory.

10. The apparatus of claim 1, wherein the network interface is coupled to a server computing platform, a host computer, a rack, or a data center.

11. The apparatus of claim 1, wherein the at least one processor to:
    copy at least a payload of the packet into the processor cache.

12. A method comprising:
at a network interface:
  storing at least one entry, wherein the at least one entry comprises packet characteristics and an associated context pointer;
  monitoring for receipt of at least one packet that includes characteristics corresponding to content of an entry;
  based on a received packet including characteristics corresponding to content of an entry, providing, to a host system a context address related to context information associated with the received packet, the context information associated at least with network protocol processing; and
  causing a prefetch of one or more context information associated with the received packet into a processor cache, wherein causing a prefetch of one or more context information associated with the received packet into the processor cache comprises causing copying of context information prior to processing of the context information.

13. The method of claim 12, wherein at least one context information comprises one or more of: a media access control (MAC) context, IPv4 context, transmission control protocol (TCP) context, socket context, or an application context.

14. The method of claim 12, wherein the context address comprises a memory address pointer to a start of a group of one of more context pointers to one or more context information, wherein the one or more context information comprise one or more of: a media access control (MAC) context, IPv4 context, transmission control protocol (TCP) context, socket context, or an application context.

15. The method of claim 12, wherein the received packet comprises a packet received at the network interface or a packet provided for transmission from the network interface.

16. The method of claim 12, comprising:
  copying at least a payload of the received packet into the processor cache.

17. A system comprising:
  a network interface comprising at least one processor and at least one memory;
  a computing platform communicatively coupled to the network interface and comprising at least one processor and at least one memory, wherein:
  the at least one processor of the network interface to:
    store at least one entry, wherein the at least one entry comprises packet characteristics and an associated context address and wherein the packet characteristics and the associated context address are to program the network interface to monitor for one or more flows corresponding to the packet characteristics;
    process a received packet to determine a context address associated with the received packet and
    based on a stored entry including a context address associated with the received packet, provide a portion of the received packet and the context address from the stored entry to the computing platform, wherein:
      the at least one processor of the network interface is to cause a prefetch of one or more context information associated with the received packet into a processor cache,
      to cause a prefetch of one or more context information associated with the received packet into the processor cache comprises cause a copy of context information prior to processing of the context information;
  the at least one processor of the computing platform to:
    retrieve context information associated with the context address and
    use a portion of the context information to process the received packet.

18. The system of claim 17, wherein the context information comprises one or more of: a media access control (MAC) context, IPv4 context, transmission control protocol (TCP) context, socket context, or an application context.

19. The system of claim 17, wherein the at least one processor of the network interface is to:
  copy at least a payload of the received packet into the processor cache.

\* \* \* \* \*